United States Patent Office 3,179,723
Patented Apr. 20, 1965

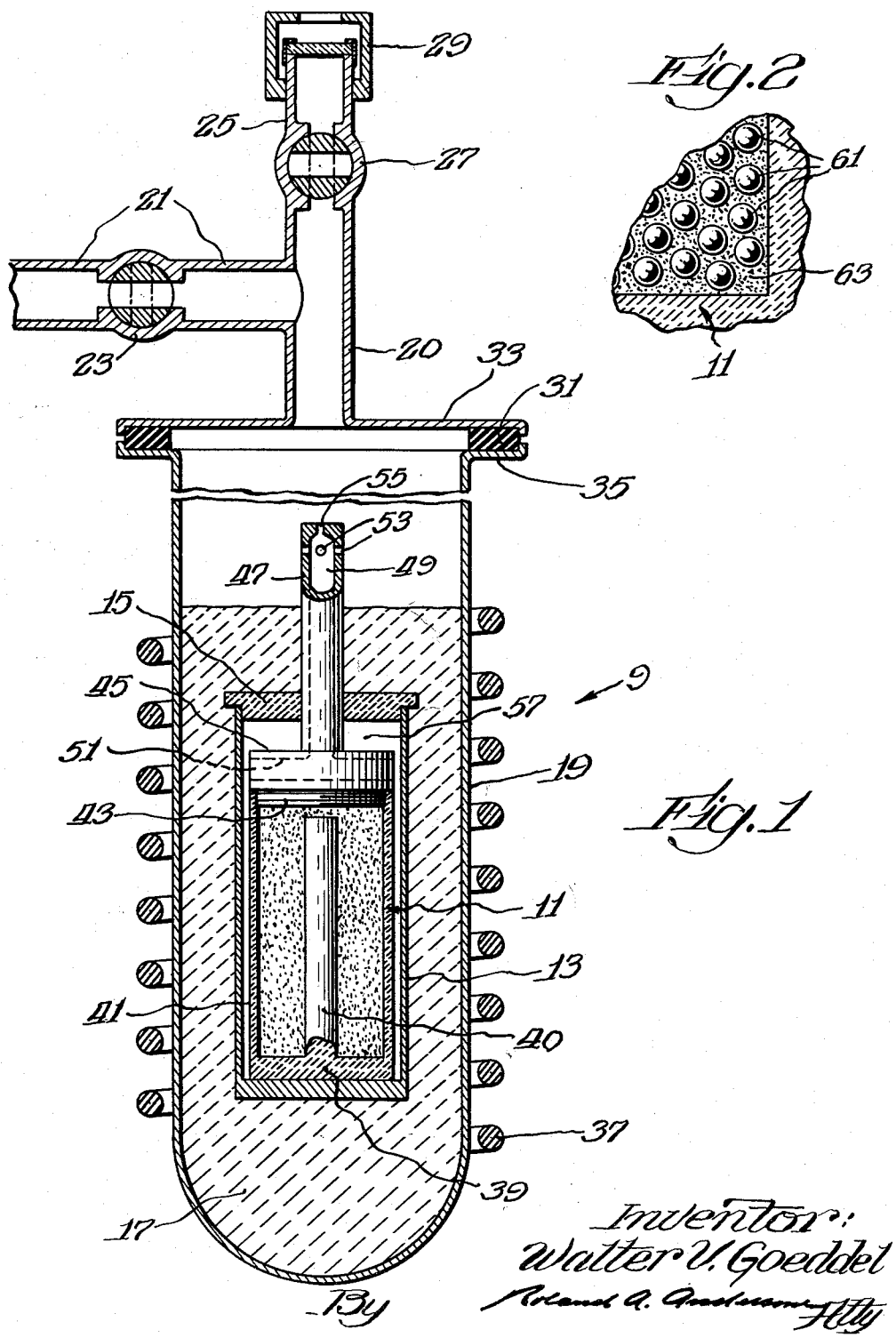

3,179,723
METHOD OF FORMING METAL CARBIDE SPHEROIDS WITH CARBON COAT
Walter V. Goeddel, Poway, Calif., assignor, by mesne assignments, to the United States of America as represented by the United States Atomic Energy Commission
Filed June 12, 1962, Ser. No. 202,031
8 Claims. (Cl. 264—15)

The present invention generally relates to carbides and more particularly relates to improved carbide particles having increased high temperature stability.

Generally, the higher the operating temperature for a nuclear reactor, the more efficient the operation of the reactor. However, in providing nuclear fuel for use in a high temperature nuclear reactor, it is important that the fuel as well as the other components in the reactor system have suitable higher temperature stability.

It would be desirable to provide nuclear fuel particles as well as other components of a reactor system capable of withstanding high temperatures of the order of 2000° C. and above for extended periods of time without undergoing substantial deterioration. Nuclear fuel carbides have been utilized in some types of high temperature nuclear reactors. Some problems have occasionally been encountered with their use. Various efforts have been made to increase the stability of such carbides by, in some instances, applying to the surfaces of the carbide particles a protective coating of carbon, such as pyrolytic carbon. However, even such coated particles have a tendency to deteriorate at temperatures in excess of about 2000° C. In many instances, the protective pyrolytic carbon coating is penetrated by the carbides of the particles, and fission product migration substantially increases after such penetration, usually a highly undesirable phenomenon, in view of the danger of radioactive contamination of the nuclear reactor coolant and other parts of the reactor system.

Other metal carbide particles which might be employed in nuclear reactors, for example, thermal neutron absorbing metals, commonly termed poisons in carbide particle form for use in control rods and the like, are also subject to deterioration at temperatures of the order of 2000° C. and above. It would be desirable to increase their thermal stability, so that the poisons thereof would be less subject to loss by volatilization. Poison metal carbide particles, even though coated with a protective jacket of pyrolytic or other form of carbon, still have a tendency at elevated temperatures in excess of about 2000° C. to deteriorate with loss of the poison constituents. This again is due to a failure of the protective carbon coating.

Whether the carbide utilized in a nuclear reactor is fuel carbide, poison carbide or other carbide, it is desirable to protect such carbide from contact and reaction with air and moisture, i.e., it is important to prevent carbide hydrolysis. A coating or jacket of pyrolytic carbon or other form of carbon around the carbide particles protects the particles against air and moisture so long as the integrity of the coating is maintained. Once the coating is generated or breached, deterioration of the carbide thus exposed has been found to occur relatively rapidly. Deterioration of the carbon coating, as previously indicated, occurs in many instances where the coated carbide particles are subjected to very high temperatures of the order of 2000° C., over extended periods of time.

Accordingly, it would be desirable to provide a way of preserving the integrity of the carbon coating on the particles so as to increase the thermal stability of the particles. In the case of fuel carbide particles it would be further desirable if the particles were constructed to have increased retention of fission products over a period of time at elevated temepratures.

It has been now found that metal carbides can be more effectively protected against deterioration at high temperatures and, in the case of fuel carbides, can be fabricated so as to exhibit increased retention of fission products under such circumstances. In the case of poison carbides, carbon coated particles have been provided which have a reduced tendency to suffer loss of the poison element of the carbide by volatilization at elevated temperatures of the order of 2000° C. and above.

Accordingly, the principal object of the present invention is to provide metal carbides having increased thermal stability. It is also an object of the present invention to provide metal carbide particles having a protective carbon coating and having increased thermal stability at elevated temperature. It is a further object of the present invention to provide improved nuclear fuel carbide particles having increased thermal stability and increased fission product retention, at temperatures in excess of 2000° C. over extended periods of time. It is also an object of the present invention to provide improved poison carbide particles having increased thermal stability and a reduced tendency for volatilization at elevated temperatures. It is a still further object of the present invention to provide a method of fabricating the improved metal carbide particles. It is also an object of the present invention to provide improved carbide particles which have increased resistance against damage by carbide hydrolysis, due to exposure to air and/or moisture.

Further objects and advantages of the present invention will be apparent from a study of the following detailed description and of the accompanying drawings of which:

FIGURE 1 is a schematic vertical section of one form of apparatus in which steps of the method of the present invention can be successfully practiced;

FIGURE 2 is an enlarged sectional view of one form of improved nuclear fuel carbide particles incorporating features of the present invention.

The present invention generally includes an improved metal carbide particle and a method of making the same. The carbide particle has increased thermal stability, and also increased fission product retention where the carbide is a fuel carbide. The particle is protected against carbide hydrolysis by a coating of carbon on the surfaces thereof. The coated carbide particle exhibits increased ability to maintain the protective nature and integrity of the carbon coating. Due to a particular concentration of carbon in the carbide or carbides of the particles, the integrity of the carbon coating on the surfaces of the particles is maintained over extended periods of time at elevated temperatures. Accordingly, the metal carbide disposed within the coating of carbon is more effectively protected.

Moreover, in addition to the protective outer coating of carbon, preferably pyrolytic carbon, the particle is preferably further protected with an intermediate layer of graphite, that is, a layer of graphite disposed between the surface of the main body of the carbide particle and the carbon coating thereof. Furthermore, the carbide particle may be provided in an approximately spherical form, if desired.

Now referring to the method of the present invention, metal carbide particles are formed in accordance with a particular procedure, and are then coated with a protective outer coating of carbon, preferably pyrolytic carbon. Before such coating operation, the carbide particles are preferably coated with the described intermediate layer of graphite.

In carrying out the present method, the metal carbide particles can be formed in any suitable manner employing the principles of the present invention. However, it is preferred that the carbide particles be prepared in finished form in a single integrated process from a suitable metal, oxide or similar starting material, utilizing a particular predetermined concentration of carbon.

In the preparation of nuclear fuel carbide particles, the starting material may be any suitable fertile nuclear fuel or mixture thereof, for example, thorium, uranium, or plutonium, enriched with fissile fuel or unenriched, and in the metal and/or oxide form or the like. The nuclear fuel is preferably initially in finely divided powdered form and as such is readily mixable with a suitable concentration of preferably very finely divided carbon.

The concentration of carbon mixed with the fuel is sufficient to convert all of the fuel to the highest carbide form of the fuel, e.g., uranium dicarbide. Moreover, an additional amount of carbon is present, in accordance with the following considerations.

It has been found that although nuclear fuel carbides containing a protective carbon coating disposed around the outside thereof have increased stability against deterioration at elevated temperatures of, for example, 1900° C., deterioration of the particles even at these temperatures may ultimately occur. At higher temperature, deterioration of the particles can occur more rapidly. Apparently, the carbides tend to migrate through the carbon coating.

Such fuel carbides have heretofore been manufactured by reacting nuclear fuel in the metal or oxide form with stoichiometric or approximately stoichiometric amounts of carbon, i.e., amounts just sufficient to convert all the fuel to the high carbide form, e.g., dicarbide form, during carburization. It is now believed, although the present invention is not limited to such theory, that the indicated mechanism of attack on the carbon coating by the fuel carbides may involve solution of the carbon of the coating in the carbides as the temperature of the particle increases, so that the coating is gradually absorbed and disappears, exposing the particle to moisture, air and other deteriorating environmental factors, and resulting in increased fission product loss therefrom.

Tests have now indicated that where carbon is present in the dicarbide particles in excess of the stoichiometric amount, the carbon coating around the particles has increased life as an effective protective layer for the particle. It has further been found that in order to assure maintenance of the integrity of the carbon coating during use of the particle, the particle should contain a concentration of carbon at least equal to that which will enter into solid solution in the carbide and saturate the same for all temperatures up to and including the maximum operating temperature to be encountered by the particle in a nuclear reactor. As a further protection, the particle preferably contains a concentration of carbon in excess of that amount which will saturate the solid solution of the fuel carbide in the particle.

With such a system, the indicated unbound carbon in the particle itself will preferentially enter the solid solution (being in intimate contact with the carbide, e.g., uranium dicarbide) in contrast to the pyrolytic carbon coating disposed on the outside surface of the particle. Accordingly, the integrity of the pyrolytic carbon coating is maintained.

The indicated theory explains the observed improved results obtained with respect to increased thermal stability for the particle and its carbon coating and decreased fission product migration from the coated particle, wherever the carbon initially present in the particle is in excess of the stoichiometric amount. Such results are reproducible and are not limited to the indicated theory.

In view of the above, a concentration of carbon is initially mixed with the nuclear fuel in the present method, which concentration is in excess of the stoichiometric amount necessary to convert all the nuclear fuel to the highest carbide form, e.g., uranium dicarbide form. Preferably, the excess carbon is at least sufficient to saturate the solid solution of the carbide for all temperatures up to, for example, about 2400° C. or so (typical operating temperature of the fuel). More preferably, a small further excess of carbon is added to further assure such complete saturation.

It will be understood that any appreciable amount of carbon in excess of the stoichiometric amount necessary for the dicarbide formation will aid in increasing the effective life of the carbon coating on the surface of the fuel particle. As an example, if a mixture of uranium oxide and thorium oxide is utilized, a concentration of carbon is added to the fuel mixture so as to ultimately provide a uranium-thorium dicarbide-carbon eutectic composition containing about 12.6 percent, by weight, of carbon, that is, a composition which is supersaturated or contains an excess of carbon above that which will go into solution for all temperatures up to about 2400° C.

It will be further understood that improved thermal stability for the carbide particles so formed is also afforded even for temperatures in excess of the highest temperature for which there is a stoichiometric amount of carbon in the carbide particle, that is, an amount of carbon which will saturate the solid solution of carbide. Under such circumstances, absorption of the pyrolytic carbon coating by the carbide particle will be slowed to some extent by the presence of free carbon more readily available for entering the carbide solution.

It will be further understood that in fuel carbide systems employing, for example, uranium-zirconium carbide or the like, it will be desirable to provide free carbon concentrations which are in excess of the stoichiometric amount for temperatures even well above 2400° C. Such fuel carbide systems are capable of use at temperatures substantially exceeding 2400° C. Accordingly, the present invention is not limited in any way to particular maximum temperatures.

It should also be noted that the thermal stability which is improved, in accordance with the present invention, for the carbide particles may be a requirement which is separate and distinct from that of increased fission product retention. Thus in certain types of fuel elements designed for repeated short-term use at very high temperatures, fission product retention is not an important consideration but thermal stability is. At any rate, in such instances, it is still important to protect the integrity of the carbon coating around the carbide particle, whether or not improvement in fission product retention is desired.

On the basis of the foregoing principles, one skilled in the art can adjust the initial concentration of carbon with respect to the concentration of nuclear fuel carbide, poison carbide or other metallic carbide in order to provide the desired improved results. The following is a description with reference to the preparation of nuclear fuel carbides but is equally applicable to the preparation of other carbide particles having the indicated improved properties:

Finely ground nuclear fuel and carbon can be mixed together in any suitable manner. However, it is preferred to initially mix the nuclear fuel-carbon mixture with a minor concentration, for example, about 1–2 percent, by weight, of suitable carbonizable organic binder such as methyl cellulose, ethyl cellulose, polyvinyl alcohol or the like, to aid in initially forming and shaping the fuel particles. A solvent for the mixture is then preferably employed so that the components can be easily and uniformly mixed together, as by slurring in the solvent. For example, if paraffin is used as the binder, trichloroethylene can be used as the solvent.

The mixing operation can advantageously be carried out in a ball mill or the like, with removal of a portion of the solvent, as by evaporation or the like, from the mixture to produce a wet mix or paste which tends to crumble or agglomerate. The paste can then be withdrawn from the ball mill and passed through a screen or the like to particulate the same.

The resultant particles can then be dried, crushed, sieved or otherwise treated to prepare the fuel in dry particle form of desired size. For example, before drying, the particles are preferably of from about 300 to about 500 micron average diameter. They can be oven dried, for example, at 140° F. then sieved to obtain the desired dried particle size of from about 295 to 495 micron (+48 −38 mesh size), which may be, for example, about 75 microns larger than the desired size of the finished spheroidized fuel pellets. Particles outside the desired size limit range can be recycled through the described mixing operations by adding more solvent to the binder.

The so-formed particles are then treated to convert the fuel to the highest carbide form. Preferably, the particles are first carburized, then melted under controlled conditions to densify the same. Such melting step is preferably carried out so as to spheroidize the particles and simultaneously coat the same with a thin adherent protective layer of powdered graphite. At any rate, the graphite coated or uncoated carbide fuel particles are then coated with carbon, preferably pyrolytic carbon.

The carburizing can be carried out in any conventional manner, that is, for example, by heating the particles in a graphite crucible disposed within a high temperature apparatus up to a sintering and carburizing temperature of, for example, about 2000° C. to about 2300° C. over a sufficiently extended period of time to prevent thermal stressing and/or fracturing of the particles. The particles are maintained at the carburizing temperature until carburizing is completed.

However, it is preferred to carry out the sintering and carburizing of the particles in a graphite bed, that is a bed of graphite powder with sufficient graphite powder present in the bed to isolate each particle from all other particles in the bed. Thus, for example, a weight ratio of from about 1 or more parts of graphite to 8 parts of nuclear fuel particles can be used. A preferred fluidized bed operation is more particularly set forth in copending U.S. application Serial No. 184,612, filed April 2, 1962, of which Howard E. Shoemaker is the inventor. A brief description of the operation follows.

Now referring to FIGURE 1 of the accompanying drawings, one form of apparatus is disclosed for carrying out the carburizing and also preferably a spheroidizing step in accordance with one embodiment of the present method. A reaction apparatus 9 is illustrated which includes a graphite crucible 11 loosely disposed with a graphite susceptor 13 fitted with a carbon cap 15. The susceptor is in turn disposed within a carbon black insulator bed 17 in the bottom portion of a quartz reaction tube 19. Tube 19 is fitted with a centrally disposed line 20, to which are connected a vacuum line 21 with valve 23, and a third line 25 with valve 27 and sight glass 29, as shown in FIGURE 1. A rubber gasket 31 seals the cover 33 of tube 19 to the flanged upper end of the subwall 35 thereof. An induction heating coil 37 is disposed around the lower portion of tube 19 to bring the crucible 11 to reaction temperature.

The graphite crucible 11 is generally cylindrical and includes a bottom portion 139 with an integral centrally disposed vertically extending graphite heat distribution core 40. Sidewall 41 of crucible 11 is integrally connected to bottom 39. To the upper end of sidewall 41 is releasably secured, as by threads 43, a graphite cap 45.

Cap 45 is provided with an upwardly extending, hollow chimney 47, the cavity 49 therein interconnecting with a horizontally extending cavity 51 in the cap 45, as shown in FIGURE 1. Chimney 47 extends up through the carbon cap 15 and terminating above the level of the carbon black insulator 17 is quartz tube 19. Adjacent its upper end, chimney 47 is provided with a plurality of horizontal vent holes 53 interconnecting with cavity 49 and with a vertical sight hole 55 aligned with line 20, line 25, valve 27 and sight glass 29.

With such an arrangement, the chimney 47 serves two purposes. It conducts reaction gases out of reaction zone, and it provides means whereby pyrometer readings can be made to determine the temperature in crucible 11.

Thus, reaction gases (such as carbon monoxide, etc., resulting from reduction of fuel oxides with carbon), migrate out of crucible 11 through the walls thereof into the space 57 between crucible 11 and susceptor 13, then through cavity 51 into cavity 49 of chimney 47. Such gases pass up through cavity 49, out of the chimney through holes 53 and 55 into the space 59 above the level of the carbon black insulator bed in tube 19. Such gases are removed from space 59 through line 20, exhaust line 21 and valve 23.

It is, of course, important to have accurate determinations of crucible 11 temperature during such processing. Pyrometric measurements of crucible 11 can be periodically made on a direct line through sight glass 29, valve 27, line 25, line 20, sight hole 55, cavity 49 and the in-line portion of cavity 51, as shown in FIGURE 1. Such measurements may be carried on optically or otherwise, in accordance with known principles based upon the high temperature characteristics of black bodies, crucible 11 acting as a black body.

In utilizing the described apparatus, the mixture of graphite flour and agglomerated nuclear fuel-containing particles is placed within crucible 11 to fill the same. Cap 45 is then screwed tightly in place. The crucible is then positioned within susceptor 13 and the susceptor cap 15 is fitted into place. The susceptor is then positioned within the carbon black insulator bed 17 in tube 19, as shown in FIGURE 1, with the upper end of chimney 47 above the level of bed 17. Gasket 31 is put in place and cover 33 is disposed therearound. Valve 23 is then opened and a vacuum is drawn through line 21 to remove oxygen from the system. If desired, the system can be flushed with inert gas or reducing gas and vacuum can be applied.

When substantially all oxidizing gas has thus been removed from the system, crucible 11 is gradually heated to sintering and carburizing temperature. Preferably, high vacuum is applied (for example, below 200–300 microns pressure) throughout the heating procedure so as to remove any evolved gases from the system. In most cases, the sintering and carburizing temperatures of from about 2000 to about 2300° C., can be reached over a heating period of, for example, 2 to 5 hours. The particular sintering and carburizing temperatures selected will depend on the particular constituents utilized as the nuclear fuel components. Generally, the higher the concentration of thorium in a thorium-uranium mixture (oxide form) the higher the carburizing temperature required. A temperature range of 2000° to 2300° C., is suitable, for example, for nuclear fuel particles containing an atom ratio of thorium-to-uranium of about 4.5:2.

Reduction of the nuclear fuel oxides to the dicarbides is accomplished at the indicated sintering and carburizing temperature, i.e., carbide formation is effected, accompanied by evolution of reaction gases ($CO, CO_2$, etc.). Carburizing and sintering temperature is maintained in the crucible until carbide formation is completed. The desired carbide formation can be detected by a reduction in the pressure in the system, since reaction gases no longer are evolved. During heating of the particles, pyrolysis of the binder in the particles occurs with some evolution of gases, usually well below the indicated carburizing temperatures. These gases are drawn off through the vacuum line, as described with respect to the carbide reaction gases.

The temperature in the crucible is then preferably raised to above the melting point of the highest melting point carbides or eutectic mixture, when present, in the particles, preferably to more than 50° C. above such melting point. Usually, such temperature will be around 2500° C., but this will depend on the particular composition of the fuel particles. It will be understood that unbound carbon, i.e., not in carbide form, will enter the solution of carbide in the particle to the limit of saturation for the particular temperature and, during subsequent cooling below the melting point, the carbon in excess of that required for saturation of the solid solution at the particular temperature will come out of solution but remain in intimate contact therewith for preferential re-entry when the temperature of the particle is raised.

The melting point of the fuel particles can be detected during the heating operation since, at such melting point, gas is suddenly substantially evolved therefrom (voids between the subparticles of the sintered particles are filled with the molten carbides, entrained gases are expelled, etc.). There also is an accompanying arrest in the rate of temperature rise in the system, due to utilization of heat for fusion or transition of the particles from solid to liquid form. Vacuum is applied to the system during such further heating. After such temperature is reached, it need only be maintained for a relatively short period of time, for example, 15 to 30 minutes, that is, only long enough to assure complete melting of the carbides of all fuel particles in the crucible.

Thus, each of the fuel particles, while being maintained separate from all other fuel particles in the crucible by the graphite flour, is preferably melted. Such melting results in an increase in the density of each fuel particle over that of the same particle in the sintered carburized form. Moreover, each melted fuel particle 61 assumes a spherical shape, as shown in FIGURE 2, since it is suspended in the graphite flour 63, and does not agglomerate with other melted fuel particles 61 in the crucible 11, due to the presence of the graphite flour 63 physically separating it from all other nuclear fuel particles 61.

The carburized fuel particles, after such treatment, are then gradually cooled to ambient temperature, preferably with the aid of a cooling gas, for example in an atmosphere of methane or other hydrocarbon gas. Thereafter, the apparatus is disassembled and the sealed crucible is transferred to an inert dry atmosphere, wherein the crucible is disassembled and the particles are removed and sieved or otherwise suitably separated (as by blowing, etc.) from the graphite flour. For example, the particles can be sieved through 35 and 100 mesh screens. Material retained on the 100 mesh screen is of about 150–240 microns in diameter.

The small percentage of oversized material greater than 35 mesh may be stored for fuel reprocessing, while the small percentage of undersized material which passes through the 100 mesh screen along with graphite powder can be reused, for example, as graphite insulation, etc. In most cases, the yield of desired size nuclear fuel carbide particles exceeds 99 percent of the particles so treated.

In accordance with the method of the present invention, the thus formed carbide particles are then coated with carbon, preferably pyrolytic carbon, in accordance with any suitable carbon coating procedure. For example, carbide particles, prepared in accordance with the foregoing and preferably containing a graphite coating can be disposed within a heating zone and heated in an atmosphere consisting essentially of methane or acetylene to above the pyrolytic decomposition point of the methane or acetylene gas, whereby carbon of the methane deposits out on the particles.

The carbon coated particles are then cooled to ambient temperature and are removed from the treating zone ready for use.

It will be understood that the described steps of melting the carbide fuel particles and spheroidizing the same in a graphite bed, whereby deposition of an adherent graphite layer on the outside thereof is provided, can be omitted from the present method, but are much to be preferred in producing improved fuel particles. So long as the fuel dicarbide particles in accordance with the present invention have a concentration appreciably above stoichiometric concentration of carbon for the dicarbides some substantial improvement in the high temperature stability and/or fission product retention thereof will be effected. However, it is preferred that the carbon concentration thereof be above that which will saturate the dicarbides for all temperatures up to at least about the maximum operating temperature of a nuclear reactor, in which the particles are to be disposed, that is up to at least about 2400° C., or more.

When the particles are additionally coated with an intermediate layer of graphite and/or are further densified during formation thereof by the melting operation and still more preferably are spheroidized, still further improvements in the resistance of the particles to fission product migration and/or to deliberation of the particles over extended periods of time at elevated temperatures are obtained. Accordingly, the described particular fluidized bed technique is preferred technique for carrying out the method of the present invention, and the spheroidized graphite layer-containing fuel carbide particles are a preferred form of the improved particles.

As previously indicated, the foregoing description is directed to the preparation of nuclear fuel carbide particles. However, the method of the present invention is equally applicable to the preparation of poison carbide particles and other forms of metal carbide particles.

In this connection, gadolinium carbide, europium carbide and similar poison carbides can be prepared in the previously described manner from the respective metals, oxides or other forms which are readily convertible to the carbides by the method of the whole invention. In each instance, the finished poison graphite particle, whether it comprises one or a mixture of carbides, contains a concentration of excess carbon greater than the stoichiometric carbon in accordance with the foregoing principles, in order to increase the durability of the pyrolytic carbon coating applied to the particle. Such particles preferably have the intermediate graphite coating, provided as previously indicated in order to further reduce volatilization, at the reactor operating temperature, of the poison components of the particles.

Various types of fuel carbide particles can be prepared, for example, those containing carbide moderator materials in solid solution therewith, e.g., uranium-zirconium carbide, uranium-beryllium carbide, uranium-molybdenum carbide, uranium-niobium carbide and the like.

The following examples further illustrate certain features of the present invention:

EXAMPLE I

A 1200 gram batch of nuclear fuel particle mix was prepared, utilizing the constituents specified in Table I below.

*Table I*

| Constituents: | Parts by weight |
|---|---|
| Uranium dioxide | 82 |
| Carbon | 18 |
| Paraffin | 2 |

The constituents were mixed together dry for 30 minutes and then trichlorethylene was slowly added to a total amount of about 340 ml. Mixing was continued until small particles were formed. The particles were then removed from the mill, oven dried at 140° F., and sieved, particles having a micron size of between about 295 and about 495 microns being retained for further treatment. Such particles were then mixed with graphite flour in a 8:1 weight ratio of nuclear fuel particles to graphite (about 150 grams of graphite flour), the resulting mixture being placed in a graphite crucible of a reaction apparatus substantially similar to that shown in FIGURE 1 of the accompanying drawings, and heated therein to 2300° C. over a three hour period, after the apparatus was evacuated to below 200 microns pressure.

The low pressure was maintained until dicarbide formation in the particles was completed. The temperature of the particles was then raised to about 2500° C., i.e., above the melting point of the particles, while the pressure in the crucible was maintained below 300 microns. The temperature was maintained at 2500° C. for 15 minutes to complete melting of the particles, after which the system was cooled to ambient temperature. The crucible was then removed to an inert atmosphere, opened and the particles were removed therefrom and sieved, using 35 and 100 mesh screens, those particles (over 99%) having a particle size of 150–420 microns being retained for a carbon coating operation.

The particles to be carbon coated were then transferred to a high temperature heating zone containing a methane atmosphere substantially devoid of water and oxygen and were heated therein to above the pyrolytic decomposition point of the methane, i.e., above 1800° C., whereupon pyrolytic carbon was formed from the methane and deposited out on the particles to form a protective outer coating having a thickness of up to about 0.008 inch. The particles were then cooled to ambient temperature and removed from the pyrolytic carbon coating apparatus. Such particles, exclusive of an intermediate graphite layer and outer pyrolytic carbon coating were found to be essentially completely converted to the dicarbide form, with a concentration of unbound carbon in the particles in excess of that concentration of carbon which could enter into a solution in the dicarbide at temperatures up to 2400° C.

The described particles were tested for 150 hours at 1900° C. and showed no indication of attack or impairment of the pyrolytic carbon coating by the dicarbides. Over the test period the particles were uniformly thermally stable and had a very low rate of fission product migration therefrom, in contrast to particles prepared in an identical manner but utilizing carbon in a stoichiometric concentration. Such latter type of particles at the end of the 150 hour test at 1900° C. showed complete penetration of the pyrolytic carbon coating, and greatly increased fission product migration therefrom. The test clearly indicated that particles prepared in accordance with the present method have improved thermal stability and fission product retention, improving their utility in high temperature nuclear reactors.

EXAMPLE II

A 1200 gram batch of nuclear fuel particle mix is prepared utilizing the constituents specified in Table II below.

*Table II*

| Constituents: | Parts by weight |
|---|---|
| Thorium dioxide | 56 |
| Uranium dioxide | 25 |
| Carbon | 17.5 |
| Ethyl cellulose | 2 |

The constituents are mixed together dry for 20 minutes and then a vaporizable solvent for the ethyl cellulose is slowly added to a total concentration of about 360 ml. Mixing is continued until small particles formed, after which the particles are removed, oven dried at 150° F. and sieved to obtain particles of an average micron size of somewhere around 300 microns. The particles are then disposed in a graphite crucible and heated therein to 2100° C., i.e., sintering and carburizing temperature, over a 3.5 hour period after the apparatus is evacuated to below 200 microns pressure. The low pressure and high temperature are maintained until dicarbide formation in the particles is completed, after which the system is cooled to ambient temperature.

The particles are then coated with pyrolytic carbon to a thickness of 0.005 inch in the manner specified in Example I, after which the particles are cooled to ambient temperature.

The pyrolytic carbon coated dicarbide particles formed in accordance with the described procedure have no intermediate graphite layer. Upon examination, it is determined that the particles are essentially completely in the dicarbide form. The particles are then heated to about 2000° C. for an extended period of time and the pyrolytic carbon coatings are examined during and after the heating period to determine their durability. The pyrolytic carbon coatings essentially retain their protective function for the dicarbides of the fuel particles for periods in excess of 20 hours at the indicated temperature, despite the absence of an intermediate graphite layer, since the particles contain a concentration of carbon in excess of that required to saturate the dicarbides at the test temperature of 2000° C. Accordingly, no substantial absorption of the pyrolytic carbon coating by the particles occurs during the test period.

Particles prepared in an identical manner from the same constituents but containing only a stoichiometric amount of carbon exhibit extensive absorption and penetration of the pyrolytic carbon coating over the test period at 2000° C., with consequent reduction in fission product retention and durability.

EXAMPLE III

A batch of thermal neutron absorbing poison particle mix is prepared utilizing substantially the same procedure as called for in Example I, but employing the constituents specified in Table III below.

*Table III*

| Constituents: | Parts by weight |
|---|---|
| Gadolinium oxide | 80 |
| Carbon | 20 |
| Paraffin | 2 |

The procedure is as set forth in Example I for mixing, particulating, carburizing and melting and spheroidizing the poison particles in a graphite bed. The particles are initially heated to about 2000° C. over a three hour period under a vacuum below 200 micron pressure to effect the carburization. They are then heated in the graphite bed to above the melting point of the thus formed carbide that is above 2200° C. under a pressure below about 300 microns and are maintained at said temperature for about 20 minutes to assure complete melting and spheroidizing thereof in the graphite bed. Cooling to ambient temperature is then effected, followed by removal of the particles from the bed and screening thereof to separate out and retain particles having suitable average particle size.

The desired particles were then carbon coated in the manner previously described in Example I. Each of the finished particles comprises a main body of gadolinium carbide, the surfaces of which have an intermediate layer of graphite firmly adhering thereto, over which is disposed a pyrolytic carbon coating. Each particle, exclusive of the intermediate graphite layer and the outer pyrolytic carbon coating, is essentially completely converted to the carbide form and contains a concentration of unbound carbon in excess of that which will saturate the carbide for all temperatures up to about 2500° C.

The described particles, when tested for an extended period of time at about 2000° C., exhibit no debilitation of the pyrolytic carbon coating. The particles are uniformly thermally stable and show no tendency for volatilization of the poison therefrom. Such particles are suitable for use in the fabrication of improved control rods for a nuclear reactor operating at elevated temperatures up to about 2500° C.

Examples I and II clearly indicate the increased thermal stability obtained in accordance with the method of the present invention by preparing fuel dicarbide particles containing an intermediate graphite layer, an outer pyrolytic carbon coating and a concentration of carbon in excess of the stoichiometric amount necessary for dicarbide formation, especially a concentration at least equal to or in excess of the saturation point of the particle dicarbide solution for all temperatures up to about 2400° C., or more. Identically produced spheroidized particles also containing pyrolytic carbon coatings and graphite intermediate layers, but containing carbon only in about stoichiometric concentration had considerably less high temperature stability and lowered fission product retention.

Similar tests run on dicarbide particles containing an outer pyrolytic carbon coating but no graphite intermediate layer indicated increased thermal stability and fission product retention for these particles containing concentrations of carbon substantially in excess of the stoichiometric amounts, in contrast to those particles containing stoichiometric amounts of carbon, but the results were not as improved as where the graphite intermediate layer was present.

Such graphite intermediate layer provides additional protection for the carbon outer coating against attack by fuel carbides at high temperatures and slows fission product migration. Thus, the contact between the dicarbides and the particle and the outer pyrolytic carbon coating is reduced by the presence of the intermediate graphite layer. Any reaction which might normally occur between the two dicarbides and the outer carbon coating is slowed down. Accordingly, this embodiment of the fuel particle of the present invention is preferred.

Example III clearly indicates the advantages of providing poison carbide particles with a coating of pyrolytic carbon and of controlling the concentration of free carbon in the carbide, as called for in the present method.

Thus, the method of the present invention provides high temperature metal particles having improved thermal stability. The particles are effectively protected for extended periods of time at high temperature against air, moisture and other debilitating agents. Such particles are suitable in the fabrication of nuclear fuel compacts and nuclear fuel elements, control rods and the like, by any suitable means, for example, compacting, pressing, sintering and the like. Such particles are particularly suitable for incorporation into high temperature gas cooled nuclear power reactors of a type known as the HTGR, which reactors are normally operated at temperatures up to about 2400° C., but the particles can also be utilized in other types of nuclear reactors.

Further advantages of the present invention are as set forth in the foregoing.

Various of the features of the present invention are set forth in the appended claims.

What is claimed is:

1. A method of fabricating a metal carbide particle which comprises mixing together a carbide-forming material containing the metal of the carbide to be formed, carbonizable binder and carbon sufficient to yield a solution of carbon in the resultant carbide in excess of the saturation concentration at elevated temperatures, converting said mixture into particles and disposing said particles in a bed of finely divided graphite, heating said particles in said bed to above the carburizing temperature of said particles, and subsequently heating said particles in said bed to above the melting point thereof so as to spheroidize the same, cooling said particles to below the melting point thereof, separating said particles from said graphite bed and heating said particles in a gaseous hydrocarbon atmosphere to above the pyrolytic decomposition temperature for said hydrocarbon to form a protective adherent outer coating of pyrolytic carbon about said particle, whereby an improved metal carbide particle having increased thermal stability is formed.

2. A method of fabricating a metal carbide particle which comprises mixing together a carbide-yielding material containing the metal of the desired carbide carbonizable binder and finely divided carbon sufficient to yield a solution of carbon in the resultant carbide in excess of the saturation concentration thereof for all temperatures up to at least the temperature to which the particle is to be exposed during use, converting said mixture into particles and disposing the particles in a bed of finely divided graphite such that said particles are isolated from one another by said graphite, heating said particles in said bed to above the carburizing temperature of said particles, and substantially heating said particles to above the melting point thereof so as to spheroidize the same, cooling said particles to below the melting point thereof, separating said particles from said graphite bed, and heating said particles in a gaseous hydrocarbon atmosphere to above the pyrolytic decomposition temperature for said hydrocarbon to form a protective adherent outer coating of pyrolytic carbon about said particle, whereby an improved metal carbide particle having increased thermal stability is formed.

3. The method of claim 1, wherein said metal carbide includes nuclear fuel carbide.

4. The method of claim 2, wherein said metal carbide includes nuclear fuel carbide.

5. The method of claim 4, wherein said fuel carbide contains uranium dicarbide.

6. The method of claim 1, wherein said metal carbide includes poison carbide.

7. The method of claim 2, wherein said metal carbide includes poison carbide.

8. The method of claim 7, wherein said poison carbide includes gadolinium carbide.

References Cited by the Examiner

UNITED STATES PATENTS

| | | | |
|---|---|---|---|
| 2,038,251 | 4/36 | Vogt | 264—15 |
| 2,781,308 | 2/57 | Creutz et al. | 176—33 |
| 2,990,351 | 6/61 | Sanz et al. | 176—71 |
| 2,990,352 | 6/61 | Finniston et al. | 176—82 |
| 3,018,238 | 1/62 | Layer et al. | 29—470.1 |
| 3,019,485 | 2/62 | Diamond | 264—15 |
| 3,031,389 | 4/62 | Goeddel et al. | 106—43 |
| 3,039,947 | 6/62 | Fortescue et al. | 176—71 |
| 3,129,188 | 4/64 | Sowman et al. | 176—89 |

FOREIGN PATENTS 873,112   7/61   Great Britain.

OTHER REFERENCES

AEC Report ORNL 1633, December 1953, pp. 1–4.
AEC Report TID 7546 (Book 2), November 1957, pp. 532, 533, 558, 559, 562.
AEC Report BMI 1357, June 1959, pp. 86 and 87.
Nuclear Power, July 1960, p. 98.
2d Geneva Conference on Atomic Energy, vol. 7, pp. 748, and 749, September 1958.
2d Geneva Conference on Atomic Energy, vol. 6, pp. 543–548, September 1958.
Progress in Nuclear Energy, vol. 5 (Metallurgy and Fuels), 1956, pp. 435, 436, and 443.

CARL D. QUARFORTH, *Primary Examiner.*

OSCAR R. VERTIZ, *Examiner.*